Patented June 8, 1926.

1,587,827

UNITED STATES PATENT OFFICE.

RUDOLF FREUDENBERG, OF VIENNA, AUSTRIA.

PROCESS FOR THE MANUFACTURE OF WOOD SUBSTITUTES.

No Drawing. Application filed January 4, 1923, Serial No. 610,726, and in Austria January 11, 1922.

The object of the present invention is the manufacture of a substitute for wood consisting in mixing sawdust or wood chippings or a mixture of both with a binding medium which contains an albuminous substance, caustic lime, water glass and water and subjecting this mixture to a pressure superior to 100 atmospheres at a temperature of about 100° centigrade. If desired I may add to the sawdust or chippings of wood any sort of fibrous material such as peat or the like. As albuminous substance I preferably use serum albumen from blood but I may as well serve myself of any other appropriate albumen especially casein, curds, or even condensed milk.

The exertions for making solid masses of sawdust have led to a large number of inventions, that mostly consist in mixing the sawdust with mineral substances such as Portland or magnesia cement, plaster of Paris, caustic lime and water-glass, or with water-glass alone and moulding the mixture into various shapes. It has also been proposed to substitute these mineral agglutinants by organic substances like for example resinous substances or asphalt, and instead of sawdust sometimes peat has been introduced into the mixtures of the above nature. None of these compositions gives a really practicable substitute for natural wood, because they do not satisfy the requirement of being workable like wood, especially to be likewise apt for nailing, cutting and gluing.

The compositions containing mineral cements are of a stonelike nature, whereas those prepared with asphalt are not fit for gluing.

According to my invention the particles of sawdust and the like materials are cemented one to another by a special binding medium under pressure, whereby there results a new substitute for wood by far superior to similar products known hitherto. The binding material used in my process consists of a solution of an albuminous substance, caustic lime and a silicate of an alkali. As albuminous substance I preferably serve myself of serum albumen, as it is prepared from blood in a manner well known in the science, and consists in filling fresh blood in trays where it is allowed to stand till its separation in fibrine and serum albumen is completed. Then the serum albumen which remains in a liquid state is drained off from the fibrine in any appropriate manner. As a silicate of alkali I may use the silicate of sodium commonly known as water-glass.

In order to make my invention perfectly clear I will now describe in what manner the same can be performed. I mix for instance about 450 kg. of sawdust with a binding or cementing medium consisting of 12–20 kg. of serum albumen from blood, 3–6 kg. of caustic lime, 3–6 kg. of water-glass and 30–40 kg. of water. If chippings of wood are to be used instead of sawdust I prefer to take a lesser quantity of water. After thorough mixing the above mass is subjected to a pressure of about 150 atmospheres at a temperature of about 100° centigrade and is then allowed to dry, which latter process is very soon terminated. There results a solid and dense body, forming a substitute for wood which in many respects is superior to the natural product. The pressure the mass is exposed to, must be varied according to the purposes the final product is destined for. Pressures of 100–200 atmospheres have been proved to give good results.

In case I make use of casein as an albuminous substance it is advantageous to modify the above given proportions and I may take 450 kg. of sawdust, 20–30 kg. of commercial casein, 7–10 kg. of caustic lime, 4–6 kg. of water-glass and 100 kg. of water. In using condensed milk the proportion of this ingredient must be regulated in taking in consideration the degree of condensing the milk has undergone. I have got satisfactotry results with commercial condensed milk by taking 450 kg. of sawdust, 100–120 kg. of condensed milk, 8–12 kg. of caustic lime, 8–10 kg. of water-glass and 80 kg. of water. If I prefer to use curds I take 450 kg. of sawdust, 40–50 kg. of curds, 7–10 kg. of caustic lime, 4–6 kg. of water-glass and about 100 kg. of water.

When fibrous material such as peat or the like is entered into the above process the proportion of sawdust or wood chippings is diminished in accordance with the weight of fibrous material added.

One of the effects of the water-glass in the mass whose production I have described is, that it makes the product waterproof. I have found that it is highly advantageous to use the water-glass in approximately the above given proportions because in this case a product is obtained that does not crumble away in water and will not grow soft even after having been immersed in hot water for a long time. The above given proportions of the elements of the new substitute for wood must be varied according to the use for which the wood substitute is intended and to the quality of the raw materials at hand. It is necessary to expose the mixture to strong pressure at the above cited high temperature in the finishing stage of the process, because if these measures are not attended to, there cannot result products that are fit for being worked upon like wood and for being glued in an efficient manner.

My invention is not confined to the use of sawdust, wood chippings or peat. In some cases I may in order to modify the qualities of the product add any sort of animal or vegetable fibres to the mass before pressing and I also may add to my binding medium any substances not enumerated before, in so far as they do not interfere with the efficacy of said medium. The wood substitute produced according to my invention can be planed, cut, nailed and especially can be veneered in the same way as natural wood.

It is known in the art to avoid warping of wood by gluing several layers of this material one to another in a manner that their natural fibres run crosswise in the adjacent layers. The product of my process is especially apt to afford an excellent and cheap substitute for this sort of fabric, for on account of the lack of fibery structure and the mass not being hygroscopical like natural wood, it cannot warp and crack, in consequence of which it is especially suitable for table plates, panels of doors, chests and wardrobes, for pianos and chairs. But one can also produce receptacles by my process, as for instance buckets and troughs.

What I claim is:

1. The process of making a substitute for wood, consisting in mixing sawdust with a binding medium, which contains an albuminous substance, caustic lime, water-glass and water and subjecting this mixture to a pressure superior to 100 atmospheres at a temperature of about 100° centigrade.

2. The process of making a substitute for wood, consisting in mixing sawdust with a binding medium which contains serum albumen from blood, caustic lime, water-glass in a solution of water and subjecting this mixture to a pressure superior to 100 atmospheres at a temperature of about 100° centigrade.

3. The process of making a substitute for wood consisting in mixing about 450 kg. of sawdust with 12-20 kg. of serum albumen from blood, 3-6 kg. of caustic lime, 3-6 kg. of water-glass, dissolved in 30-40 kg. of water and subjecting this mixture to a pressure of about 150 atmospheres at a temperature higher than 100° centigrade.

4. The process of making a substitute for wood, consisting in mixing chippings of wood with a binding medium which contains serum albumen from blood, caustic lime, water-glass dissolved in water, and subjecting this mixture to a pressure superior to 100 atmospheres at a temperature of about 100° centigrade.

5. The process of making a substitute for wood, consisting in mixing a mixture of sawdust and chippings of wood with a binding medium which contains an albuminous substance, caustic lime, water-glass and water and subjecting this mixture to pressure superior to 100 atmospheres to a temperature of about 100° centigrade.

6. The process of making a substitute for wood, consisting in mixing a mixture of sawdust and chippings of wood with a binding medium which contains serum albumen from blood, caustic lime, water-glass dissolved in water and subjecting this mixture to a pressure superior to 100 atmospheres and to a temperature of about 100° centigrade.

7. The process of making a substitute for wood, consisting in mixing a mixture of sawdust and fibrous material with a binding medium which contains serum albumen from blood, caustic lime, water-glass dissolved in water and subjecting this mixture to a pressure superior to 100 atmospheres and to a temperature of about 100° centigrade.

8. The process of making a substitute for wood, consisting in mixing a mixture of chippings of wood and fibrous material with a binding medium which contains an albuminous substance, caustic lime, and water-glass dissolved in water and subjecting this mixture to a pressure superior to 100 atmospheres at a temperature of about 100° centigrade.

9. The process of making a substitute for wood consisting in mixing a mixture of sawdust, chippings of wood and fibrous material with a binding medium which contains an albuminous substance, caustic lime and water-glass, dissolved in water and subjecting this mixture to a pressure superior to 100 atmospheres at a temperature of about 100° centigrade.

In testimony whereof I have signed my name to this specification.

RUDOLF FREUDENBERG.